United States Patent [19]

Westlake et al.

[11] 3,918,940
[45] Nov. 11, 1975

[54] COMBINED WET SCRUBBER-CLARIFIER UNIT

[76] Inventors: Robert A. Westlake, 4212 228th St. Southeast, Bothell, Wash. 98011; Frederick W. Thiele, 18542 Springdale Court Northwest, Seattle, Wash. 98177

[22] Filed: Feb. 4, 1974

[21] Appl. No.: 439,440

[52] U.S. Cl. .................. 55/223; 55/227; 55/228; 55/239; 55/242; 55/257; 261/79 A; 261/116; 261/DIG. 54
[51] Int. Cl.² ........................................ B01D 47/06
[58] Field of Search .............. 55/92–95, 227–229, 55/235–239, 240–242, 244, 257, 223; 261/79 A, DIG. 54, 116, 119, 116

[56] References Cited
UNITED STATES PATENTS

| | | | |
|---|---|---|---|
| 2,575,359 | 11/1951 | Ortgies | 55/223 |
| 3,726,513 | 4/1973 | Houghton, Jr. et al. | 55/248 |
| 3,789,585 | 2/1974 | Arnold et al. | 55/228 |

OTHER PUBLICATIONS

Leckenby Tornado Gas Scrubber Mfd. by Leckenby Co., Seattle Wash. p. 1–4 dtd. 3/28/68.

*Primary Examiner*—Bernard Nozick

[57] ABSTRACT

A combined scrubber-clarifier unit is disclosed adapted to remove particulate solids from a gas stream, the unit having improved scrubbing capability. The unit is designed to reduce the tendency of deposits of particulate solids to build up on interior surfaces of the scrubber unit tending to plug the unit. The wet scrubber is mounted atop a sealed sludge-clarification tank, the tank being large enough to provide a retention time of about 30 minutes for the slurry. The scrubber unit is one wherein the particulate-laden gas stream is directed through a venturi and directly impinged against the water held in the sealed sludge-clarification tank. The scrubber unit has a central, hollow chamber therein through which the gases exit from the scrubber unit after passage through the water in the tank. Mounted in the upper portion of the central chamber is a de-mister unit comprised of numerous slanted vanes which impart a swirling motion to moisture-laden gas passing therethrough to centrifugally separate the water and residual particulate solids from the gas on passage through the vanes. The water and particulate solids separated by the de-mister are collected and returned to the clarifying tank by a sump and drain pipes. Plugging of the drain pipes and build-up of particulate solids on the vanes of the de-mister unit are prevented by direct spraying of water adjacent the openings leading to the drains and against the vane surfaces at all times. The level of the water in the sludge clarification tank is maintained substantially constant by control means to assure optimum scrubbing capability.

4 Claims, 1 Drawing Figure

COMBINED WET SCRUBBER-CLARIFIER UNIT

BACKGROUND OF THE INVENTION

1. Field of the Invention

This invention relates to a combined wet scrubber-clarifier of improved scrubbing capability.

2. Prior Art Relating to the Invention

Gas scrubbers for dust and fume control of the Doyle type, which impinge dirty gas through a venturi into a pool of water and subsequently direct the partially cleaned, water-laden gas through means centrifugally separating the particulate solids and water from the cleaned gas, are commercially available. In addition, web scrubbers combined with clarifiers are known, as disclosed, for example, in U.S. Pat. Nos. 3,577,709; 2,575,359; 2,585,440; and 3,481,115.

Efficient performance of a combined wet scrubber-clarifier unit wherein the wet scrubber is of the Doyle type depends on accurate control of the water level in the clarification tank and on elimination or reduction of deposits of particulate solids which build up on interior surfaces of the scrubbing unit tending to plug drains and inhibit efficient flow of gas and fluids through the unit.

SUMMARY OF THE INVENTION

This invention is directed to improvements in a combined wet scrubber-clarifier which (1) improve the performance of the wet scrubber in terms of its scrubbing capability, and (2) reduce the problems of plugging due to deposits of particulate solids on the interior surfaces of the scrubbing unit. The system comprises (1), a settling tank holding a predetermined amount of water and having means therein to remove sludge therefrom, (2) a wet scrubber unit comprising a cylindrical housing with its bottom edge projecting below the level of water in the tank having means for impinging a particulate-laden gas stream into the pool of water in the tank, the scrubber unit also including an inner, hollow chamber through which the partially cleaned, moisture-laden gas passes, (3) a de-mister unit mounted in the chamber to impart a swirling motion to the exiting gases to centrifugally separate residual particulate solids and water entrained in the gas stream, (4) means for collecting the water and particulate solids separated from the gas on passage through the de-mister unit, and (5) drain means communicating with the collecting means for draining the particulate solids and water to the settling tank, (6) a cover on the settling tank to seal it and the scrubber unit against the surrounding ambient atmospheric pressure, (7) means for reducing build-up of particulate solids on the vanes of the de-mister unit and reducing plugging of the drains by particulate solids, including (a) spray nozzles mounted to spray water which is substantially free of particulate solids against the vanes of the demister, (b) spray nozzles mounted adjacent each of the drains to spray water which is substantially free of particulate solids thereagainst, and (c) means for supplying water to the set of nozzles, and (8) means for maintaining the water level in the clarifying tank between predetermined limits during operation of the system.

BRIEF DESCRIPTION OF THE DRAWING

The drawing is a perspective view of the scrubber-clarifier unit of this invention with portions broken away to show the interior thereof.

DESCRIPTION OF THE PREFERRED EMBODIMENT

Figure 1:
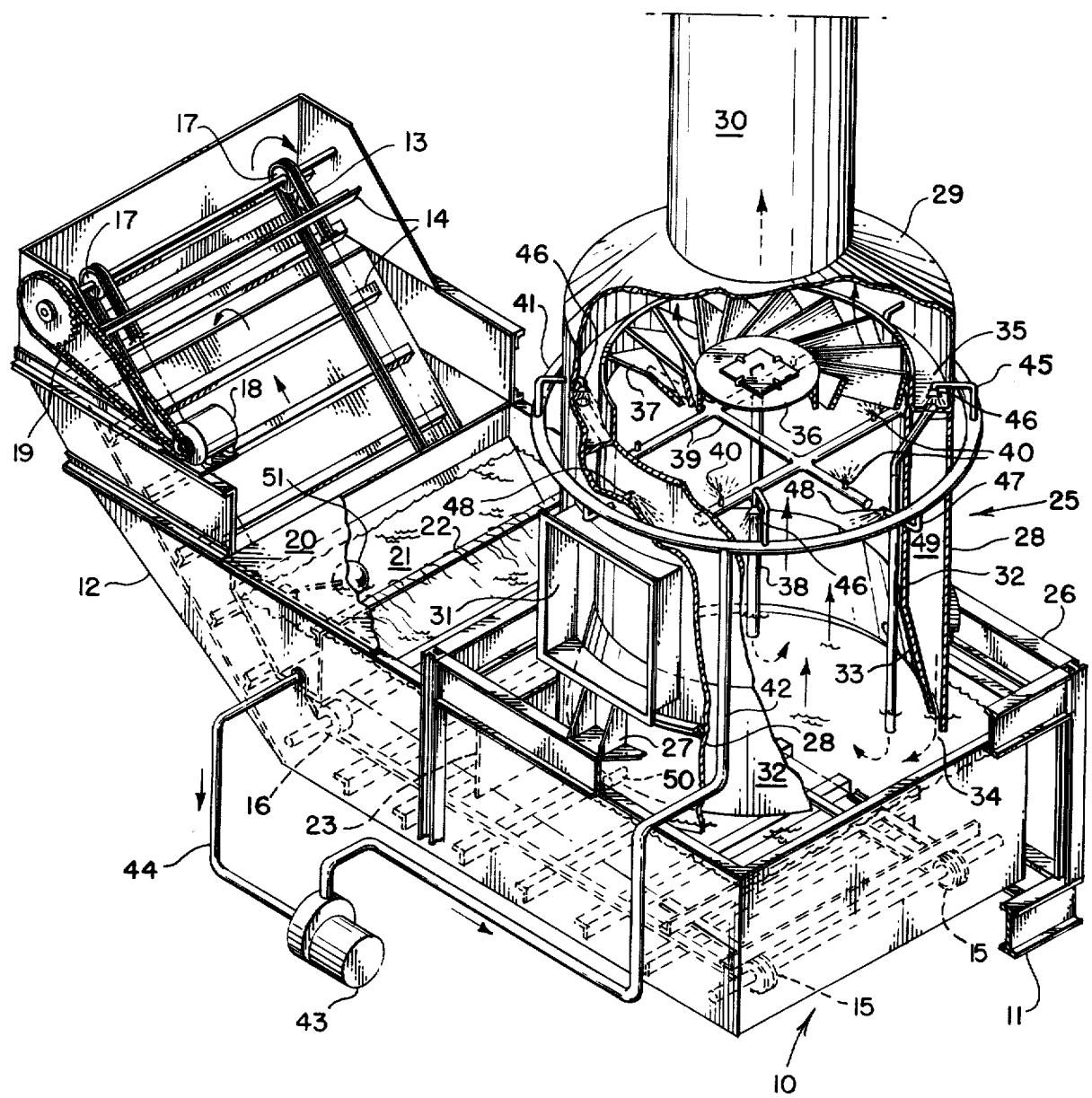

A preferred embodiment of the invention is shown in the drawing and generally includes a rectangular sludge clarification tank 10 provided with sludge removal means supported on a foundation. The tank is of a size to permit a retention time of water processed through the scrubber unit in the tank of about 30 minutes. One end of the tank is provided with a sloping bottom 12, as illustrated. A chain conveyor 13, having transversely mounted scrapers 14 at spaced intervals therealong, is trained about idler rollers 15, 16 and drive shaft sprockets 17. The idler rollers are placed so that the lower course of the conveyor and the scrapers thereon are pulled along the bottom of the tank to remove sludge deposits from the bottom of the tank and convey them out of the tank. The conveyor is powered by a motor 18 whose shaft drives the conveyor by a chain and sprocket arrangement 19. The tank 10 is divided into a clarifying or settling section and an overflow tank 21 by a weir 22, the top edge of the weir placed at a level below the top edge of the tank to regulate the water level in the clarifying or settling section of the tank. The weir also forms one side wall of the inner overflow tank 21 which receives the clarified water from the clarifying section of the tank.

A vertical wet scrubber unit 25 is mounted atop the settling tank at one end thereof and is supported in place over the tank by horizontal and vertical supports 11 and 26. Plates 27, welded between the outer wall of the scrubber unit and the horizontal supports 26, secure the scrubber unit. The scrubber unit includes an outer cylindrical wall 28, open at the bottom and closed at the top by a top wall 29. A stack 30 extends through an opening in the center of the top wall. An air inlet opening 31 in the wall 28 of the tank is surrounded by a flange for connecting to a suitable conduit. Spaced inwardly from the outer wall is an inner cylindrical wall 32, parallel to the outer wall along its upper portion. The lower portion 33 slants toward the outer wall and terminates near the lower end of the outer wall a distance from the outer wall sufficient to provide a venturi section 34 completely around the scrubbing unit through which the particulate-laden gases entering the air inlet 31 are directly impinged against the water in the tank 10. The lower edge of outer wall projects down into the tank below the water level established by the top edge of the weir 23. The lower edge of the inner wall terminates above the water level established by the weir a distance which varies depending on the particular application, but generally ranging from one fourth inch to three fourth inch.

A horizontal plate connects the inner and outer walls a short distance below the upper terminating edge of the inner wall to provide a sump 35 for particulate solids and water recovered after passage of the gases exiting from the scrubber unit through the de-mister unit to be described. The de-mister unit is mounted across the central, hollow chamber of the scrubber unit near the upper end thereof and is designed to impart a swirling motion to gases passing therethrough to centrifugally separate entrained residual particulate solids and water picked up by the gas stream on passage through the water bath in the tank. The heavier water and particulate solids are thrown by centrifugal force against the inner surface of the outer wall 28 and collect in the sump. The de-mister unit includes a central hub 36 from which extends a plurality of vanes 37 connected at their opposite ends to the inner surface of wall 32. The vanes are disposed at an angle such that a swirling motion is imparted to the gas stream passing therethrough to centrifugally throw the relatively heavy particulate solids and water particles entrained in the gas stream outwardly into contact with the inner surface of the outer wall.

Openings (four shown) at spaced intervals in the floor of the sump 35 connect with drain pipes 38 which extend through the central, hollow chamber of the scrubber and terminate below the level of the water in the settling tank 10. During operation of the scrubber unit, the particulate solids and water recovered from the de-mister unit drain back into the settling tank 10. In time, the particulate solids tend to deposit on the walls of the drains and around the openings in the sump and plug them. In addition, particulate solids still entrained in the gas stream after passage through the water bath in the tank 10 tend to deposit on the vanes of the de-mister unit so that, in time, the demister unit ceases to work properly. It was found that by locating suitably disposed spray nozzles adjacent to the drain openings of the sump and adjacent to the vanes of the de-mister unit to continuously spray clarified, particulate-free water against the vanes and drain openings, plugging and deposition of particulate solids could be eliminated.

A pipe grid 39, connected to a source of makeup water (not shown), is positioned directly beneath the de-mister unit as illustrated in the drawing. Several full spray jet nozzles 40 are located at spaced intervals along the grid, the nozzles directed to spray a continuous stream of water against the vanes of the de-mister unit to prevent deposition of particulate solids thereon.

A circular header pipe 41 is diposed around the outside of the outer wall 28 of the scrubber unit, the header pipe connected by pipe 42 to pump 43, which pumps clarified, particulate-free water from overflow tank 21 through pipe 44. Pipes 45 extend from the header through the outer wall 28 of the scrubber unit at spaced intervals along the header 41 and adjacent each of the drain openings of drain pipes 38. Fan-shaped spray nozzles 46 on the terminating end of each pipe 45 are located adjacent each of the drain openings in the sump and are oriented to spray water into the drain openings. Pipes 47, leading from the header 41, extend through the outer wall near the upper end of the air chamber 49 formed by the outer and inner walls 28 and 32 of the scrubber unit and terminate in fan-shaped nozzles 48, which spray a continuous stream of water against the inner walls of the chamber 59 to prevent deposition of particulate solids thereon and to begin wetting of the particulate solids prior to impingement of the gas stream into the water bath in the tank through the venturi.

Pressure-equalizing pipes 50 are located at spaced intervals around the scrubber unit just above the level of water in the tank, the pipes connecting the interior of the settling tank above the water level with the interior, hollow chamber of the scrubber unit to equalize the air pressure between the two. Unless the pressure is equalized between the two chambers, the venturi action of the scrubber unit does not function properly.

The tank 10 is sealed by a cover 20 (only a portion of which is shown) from contact with the ambient atmosphere surrounding the scrubber unit and tank. The cover extends and is sealed around the scrubber unit and over the inner overflow tank.

A level-control float 51 is located in the overflow tank, the level-control float connected to a control valve (not shown). The control valve connects between a source of make-up water and the pipe grid 39 feeding water to the spray nozzles positioned beneath the de-mister unit. When the water level in the overflow tank 21 falls below a predetermined level, the control valve opens, allowing make-up water to enter the scrubber system through the spray nozzles 40. The scrubbing capability of the scrubber unit is quite sensitive to water level; thus it is necessary to maintain the water level in the tank substantially constant. This is particularly true with respect to maintaining the distance between the bottom edge of the inner wall 33 and the water level in the tank. If the distance varies too widely, for example, greater than ± ½ inch, plugging problems are created.

OPERATION

For operation, the tank 10 is filled with water to the desired level. Particulate-laden gas is delivered to air inlet 31 by a fan (not shown) so that the scrubber unit is under positive pressure. Additionally, pump 43 is started to begin pumping water from the overflow tank 21 through the circular header 41 and the sets of nozzles 46 and 48 spraying water into the air chamber 49 and above the drain openings of the sump. The particulate-laden gas stream entering air inlet 31 is partially wetted by the streams of water entering the air inlet chamber through spray nozzles 48. The air ciculates around the air inlet chamber and is forced to directly impinge against the water surface in settling tank 10 as it passes through the venturi 34 established by the closely adjacent inner and outer walls 28 and 32 of the scrubber unit. The greatest portion of the particulate solids is removed from the gas stream during passage of the gas stream through the water in the tank. The partially cleaned gases exit from the scrubber unit through the hollow, central chamber and are pulled upwardly through the demister unit wherein violent centrifugal swirling motion is imparted to the air drawn through the venturi to centrifugally throw residual particulate solids and moisture in the form of water droplets picked up by the gas stream against the inner surface of the outer wall 28 of the scrubber unit where they fall into the sump and drain back into tank 10 through drain pipes 38. Make-up water entering through full spray nozzles 40 sprays a stream of water against the vanes of the de-mister unit to prevent deposition of particulate solids thereon and to aid in removing residual particulate solids from the gas stream.

The sludge removal conveyor is generally operated intermittently to remove sludge deposits accumulating in the bottom of the tank.

The unit described provides improved scrubbing performance in terms of its scrubbing capability.

The embodiments of the invention in which a particular property or privilege is claimed are defined as follows:

1. A scrubbing apparatus for removing entrained particulate solids from a gas stream wherein the scrubber unit includes as an integral part thereof a slurry deconcentration and sludge removal means sealed from contact with the ambient atmosphere, comprising
 a sludge-clarification tank holding a predetermined amount of water defining a pool having means therein to remove settled sludge therefrom, a wet scrubber unit mounted on the tank having (1) an outer peripheral wall having an inlet with its bottom edge projecting below the level of water in the tank, (2) an inner peripheral wall spaced from the outer wall having its bottom edge terminating above the water level in the tank and having the outer and inner walls spaced near their bottom edges to form venturi section means for impinging a particulate-laden gas stream into the pool of water held in the tank, said inner peripheral wall defining an inner tubular chamber in the unit through which the partially cleaned and moisture-laden gases exit after passage through the pool of water, (3) a de-mister unit including vanes mounted in the chamber to impart a swirling motion to the exiting gases to centrifugally separate residual particulate solids and entrained water droplets from the gas stream, (4) means extending from the chamber to the outer wall for collecting the water and particulate solids removed from the gases on passage through the de-mister unit, and (5) drain means in communication with the collection means for returning the collected water and particulate solids to the water in the settling tank, a cover on the tank sealing the scrubber unit and contents of the tank from the ambient atmospheric pressure during operation, means for reducing the tendency of the vanes of the de-mister unit to coat with particulate solids and reducing plugging of the drain means returning the collected water and particulate solids to the settling tank, including (1) a first series of spray nozzles mounted adjacent the vanes to continuously spray water against the vanes of the de-mister, and (2) a second series of spray nozzles mounted adjacent each of the drains to spray water thereinto, and (3) means connected to the nozzles supplying water to the nozzles, and means maintaining the water level in the settling tank between predetermined limits during operation of the unit for effecting efficient scrubbing capacity of the unit.

2. The system of claim 1 including pressure equalizing means extending between the interior, hollow chamber of the scrubber unit and the atmosphere above the settling tank to equalize the air pressure between the two.

3. The system of claim 1 wherein the means for maintaining the water level includes (1) a transverse weir remotely located from the scrubber unit having its upper edge located to regulate the level of water in the settling tank and communicating with an overflow tank positioned within the settling tank, (2) means for circulating the water passing over the weir into the overflow tank to the second series of spray nozzles, (3) means providing a source of make-up water, (4) level-control means sensing the water level in the overflow tank, and (5) valve control means operatively connected to the level-control means for introduction of make-up water to the first series of spray nozzles to maintain the level of the water in the settling tank substantially constant.

4. The system of claim 3 including a third series of spray nozzles for spraying a fan-shaped stream of water into contact with the particulate-laden gas stream entering the scrubber unit before the gases are impinged into the water in the settling tank.

* * * * *

UNITED STATES PATENT AND TRADEMARK OFFICE
CERTIFICATE OF CORRECTION

PATENT NO. : 3,918,940

DATED : November 11, 1975

INVENTOR(S) : Robert A. Westlake and Frederick W. Thiele

It is certified that error appears in the above–identified patent and that said Letters Patent are hereby corrected as shown below:

Column 1, line 15, change "web" to --wet--.

Column 2, line 49, change "23" to --22--; line 53, change "fourth" to --fourths--.

Column 3, line 37, change "diposed" to --disposed--; line 53, change "59" to --49--.

Column 4, line 41, change "demister" to --de-mister--.

Claim 2, line 1, change "pressureequalizing" to --pressure-equalizing--.

Signed and Sealed this

Twenty-fourth Day of July 1979

[SEAL]

Attest:

LUTRELLE F. PARKER

Attesting Officer    Acting Commissioner of Patents and Trademarks